United States Patent
McNeil et al.

(10) Patent No.: US 10,520,012 B1
(45) Date of Patent: Dec. 31, 2019

(54) ROD END HAVING WEAR MITIGATION FEATURES FOR AN AUGMENTER NOZZLE ON A JET ENGINE TURBINE

(71) Applicant: Roller Bearing Company of America, Inc., Oxford, CT (US)

(72) Inventors: Scott McNeil, Gilford, NH (US); Sean Vintinner, Santa Ana, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 728 days.

(21) Appl. No.: 14/999,260

(22) Filed: Apr. 14, 2016

Related U.S. Application Data

(60) Provisional application No. 61/967,065, filed on Apr. 14, 2015, provisional application No. 62/177,147, filed on Aug. 7, 2015.

(51) Int. Cl.
| | |
|---|---|
| *F16C 11/00* | (2006.01) |
| *F16C 7/02* | (2006.01) |
| *F16C 11/06* | (2006.01) |

(52) U.S. Cl.
CPC .............. *F16C 7/02* (2013.01); *F16C 11/068* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,064,692 | A * | 12/1936 | Shank | B60T 11/00 403/158 |
| 3,822,100 | A * | 7/1974 | Reinsma | F16C 11/0614 403/134 |
| 4,055,369 | A * | 10/1977 | Lynn | F16C 11/0614 277/361 |
| 4,190,302 | A * | 2/1980 | Lynn | F16C 11/0614 277/361 |
| 4,253,711 | A * | 3/1981 | Lynn | F16C 11/0614 384/130 |
| 4,797,050 | A | 1/1989 | Habicht | |
| 5,088,279 | A | 2/1992 | MacGee | |
| 5,110,069 | A | 5/1992 | Webb | |
| 5,405,200 | A * | 4/1995 | Sumiyoshi | F16C 11/0614 384/208 |
| 6,352,368 | B1 * | 3/2002 | James | F16C 11/0614 384/203 |
| 6,669,393 | B2 * | 12/2003 | Schilling | F02C 7/20 244/54 |
| 6,705,647 | B1 | 3/2004 | Palmer | |
| 6,907,848 | B2 * | 6/2005 | Beardmore | F01M 1/06 123/41.35 |

(Continued)

FOREIGN PATENT DOCUMENTS

| | | |
|---|---|---|
| CN | 201007678 Y | 1/2008 |
| CN | 202790056 U | 3/2013 |

(Continued)

*Primary Examiner* — Matthew R McMahon
(74) *Attorney, Agent, or Firm* — Murtha Cullina LLP

(57) ABSTRACT

A rod end includes a shaft and a head extending from the shaft. The head has an opening extending therethrough. The rod end includes a spherical bearing rotatably disposed in the opening. The spherical bearing is manufactured from an austenitic stainless steel alloy that includes 16 to 17 weight percent chromium and 0.1 to 0.18 weight percent nitrogen.

28 Claims, 19 Drawing Sheets

(56) References Cited

U.S. PATENT DOCUMENTS

| | | | |
|---|---|---|---|
| 7,726,469 B2 | 6/2010 | Frost et al. | |
| 8,002,489 B2 * | 8/2011 | Mahy | F16C 11/0614 267/141.2 |
| 8,698,367 B2 * | 4/2014 | Sortore | H02K 1/2753 310/156.08 |
| 9,259,275 B2 | 2/2016 | Burbank | |
| 9,272,781 B2 * | 3/2016 | Day | B64C 27/605 |
| 10,228,057 B2 * | 3/2019 | Hudson | F16C 11/045 |
| 2002/0172593 A1 | 11/2002 | Udall | |
| 2002/0189439 A1 | 12/2002 | Scotto | |
| 2006/0225427 A1 | 10/2006 | Bainachi et al. | |
| 2009/0007774 A1 | 1/2009 | Savas et al. | |
| 2009/0080818 A1 * | 3/2009 | Sasaki | F16C 11/0614 384/203 |
| 2010/0021094 A1 | 1/2010 | Kaufman et al. | |
| 2010/0269629 A1 * | 10/2010 | Nunn | F16C 11/0614 74/579 R |
| 2011/0119865 A1 | 5/2011 | Vigeh et al. | |
| 2011/0142532 A1 * | 6/2011 | Diemirbey | B22F 3/24 403/56 |
| 2013/0160604 A1 * | 6/2013 | McNeil | F16C 23/045 74/594 |
| 2014/0166376 A1 * | 6/2014 | Maier | B62D 55/0842 180/9.5 |
| 2014/0294484 A1 | 10/2014 | Nunn et al. | |
| 2015/0233419 A1 | 8/2015 | Hacthmann | |
| 2016/0015462 A1 | 1/2016 | Burbank et al. | |
| 2016/0040484 A1 | 2/2016 | Underwood et al. | |

FOREIGN PATENT DOCUMENTS

| | | |
|---|---|---|
| DE | 4034808 A1 | 5/1991 |
| GB | 595598 | 12/1947 |
| KR | 100581395 B1 | 5/2006 |
| WO | 2014138503 A1 | 9/2014 |

* cited by examiner

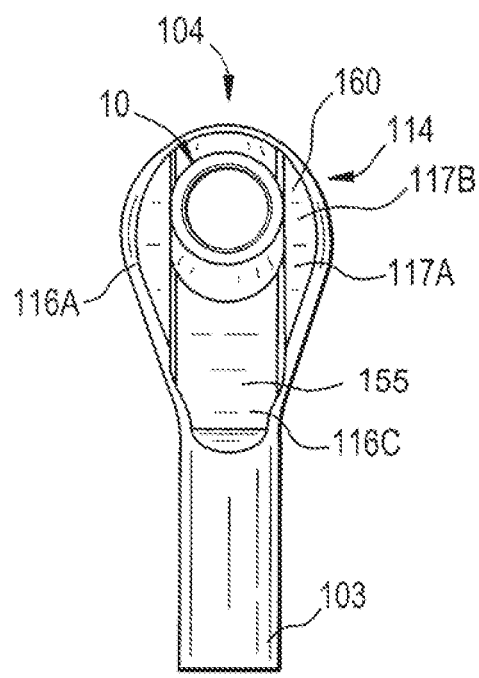
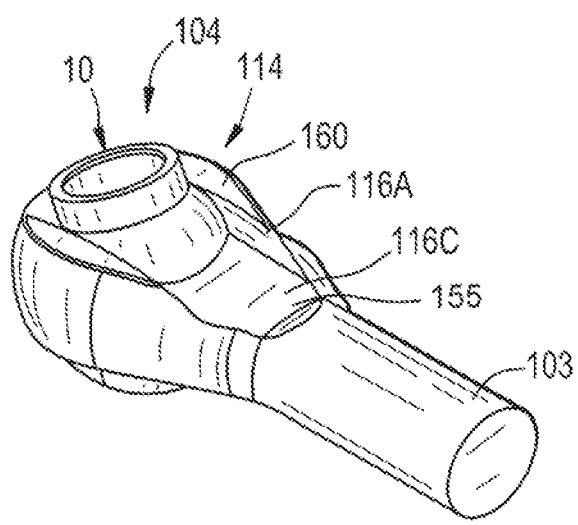
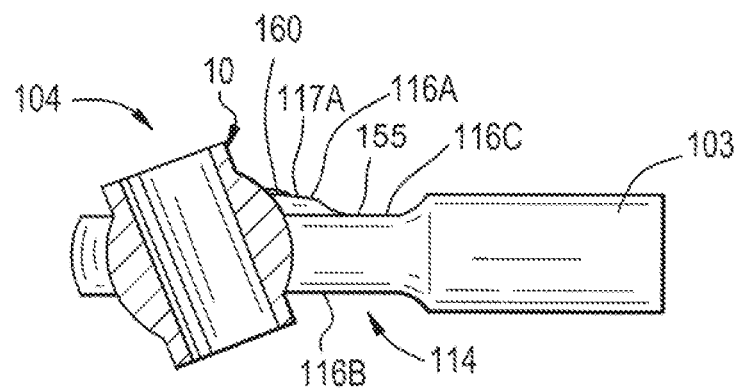

| Condition | Endurance Limit, KSI | Surface Finish, μIN. (AA) |
|---|---|---|
| Gentle Surface Grind | 74 | 17 |
| Gentle Electrochem Mach. | 42 | 19 |
| Abusive Electrochem Mach. | 42 | 55 |
| Electropolishing | 28 | 15 |
| Finishing Elec Dis Mach. | 29 | 65 |
| Roughing Elec Dis Mach. | 29 | 155 |
| AA, Arithmetic Average | | |

FIG. 21

Nitronic 60
Table 36 Properties Acceptable for Material Specification (Bar and Wire)

| Condition | Size | UTS ksi (MPa) | 0.2% YS ksi (MPa) | Elongation % In 4XD | Reduction of Area % | Hardness HRB |
|---|---|---|---|---|---|---|
| Annealed | 1/2" o + under (12.7mm) | 105 min (724) | 55 min (379) | 35 min | 55 min | 85 min |
| Annealed | Over 1/2" o (12.7mm) | 95 min (655) | 50 min (345) | 35 min | 55 min | 85 min |

Stellite 6
Nominal Tensile Properties at Room Temperature

| | Ultimate Tensile Strength RM | | Yield Stress Rp (0.2%) | | Elongation | Elastic Modulus | |
|---|---|---|---|---|---|---|---|
| | ksi | MPa | ksi | MPa | A% | psi | GPa |
| Castings | 123 | 850 | 101.5 | 700 | <1 | $30.3 \times 10^6$ | 209 |
| Stellite* HS-6 () | 183.5 | 1265 | 109 | 750 | 3-5 | $34 \times 10^6$ | 237 |

(*) "HS" = HIP-consolidated. Ref: Ashworth et al. Power Metal. 1999 42 (3) p. 243-249 and internal tests

FIG. 22

| Composition of Nitronic® 60 | | |
|---|---|---|
| Composition | WT, % min | WT, % max |
| Carbon | 0.060 | 0.080 |
| Manganese | 7.50 | 8.50 |
| Phosphorus | ... | 0.040 |
| Sulfur | ... | 0.030 |
| Silicon | 3.70 | 4.20 |
| Chromium | 16.00 | 17.00 |
| Nickel | 5.00 | 8.50 |
| Molybdenum | ... | 0.75 |
| Copper | ... | 0.75 |
| Nitrogen | 0.10 | 0.16 |
| Titanium | ... | 0.050 |
| Aluminum | ... | 0.020 |
| Boron | ... | 0.0015 |
| Columbium | ... | 0.10 |
| Tin | ... | 0.050 |
| Vanadium | ... | 0.20 |
| Tungsten | ... | 0.15 |

FIG. 23

Table 10 Wear Compatibility of Nitronic® 60 Compared with 17-4 PH and Stellite 6B Against Various Alloys

| Alloy | Hardness Rockwell | Weight loss of Couple (mg/1000) cycles | | |
| --- | --- | --- | --- | --- |
| | | 17-4 PH (CA3) | Nitronic 60 (8.95) | Stellite 6B (C46) |
| Type 304 | B99 | 24.7 | 6.0 | 3.1 |
| Type 316 | B91 | 18.5 | 4.3 | 5.5 |
| 17-4 PH | C31.5 | 66.1 | 4.9 | 2.7 |
| 17-4 PH | C4.3 | 52.8 | 5.4 | 3.8 |
| Nitronic® 32 | B95 | 17.2 | 3.2 | 2.0 |
| Nitronic® 5D | B99 | 15.7 | 3.5 | 2.9 |
| Nitronic® 6D | B95 | 5.4 | 2.8 | 1.9 |
| Stellite 6B | C48 | 3.8 | 1.9 | 1.0 |
| Chrome Plate | ... | 3.3 | 2.1 | .03 |
| Silicon Bronze | B93 | 2.0 | 2.2 | 1.9 |
| K-500 Monel | C34 | 34.1 | 22.9 | 18.8 |
| Type 416 | C24 | ... | 5.5 | 43.0 |
| Type 431 | C32 | ... | 3.0 | 1.0 |
| Waspaloy | C36 | ... | 31 | 2.4 |
| Inconel 778 | C38 | ... | 31 | 2.7 |
| Inconel Y-750 | C36 | ... | 5.5 | 8.0 |

FIG. 24

1e. Left end simply supported, right end simply supported

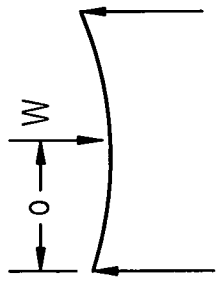

$R_A = \frac{W}{l}(l-a) \quad M_A = 0$ $\theta_A = \frac{-Wa}{6EIl}(2l-a)(l-a)\gamma_A = 0$ $R_{\mathcal{E}} = \frac{W}{l} \quad M_n = 0$ $\theta_B = \frac{Wa}{6EIl}(l^2-a^2)\gamma n = 0$ Max $M = R_A a$ at $x = a$; max possible value $= \frac{Wl}{4}$ when $a = \frac{1}{2}$ Max $y = \frac{-Wa}{3EIl}\left(\frac{l^2-a^2}{3}\right)^{\frac{1}{2}}$ at $x = l\left(\frac{l^2-a^2}{3}\right)^{\frac{1}{2}}$ when $a < \frac{1}{2}$ max possible value $= \frac{-Wl^3}{48EI}$ at $x$ $= \frac{1}{2}$ when $a = \frac{1}{2}$ Max $O = O_A$ when $a < \frac{1}{2}$; max possible value $= -0.0642 \frac{WP}{EI}$ when $a = 0.4231$

FIG. 27

Chemical Composition of Inconel® 718

| Ni | Cr | Fe | Mo | Nb | Co | Mn | Cu | Al | Ti | Si | C | S | P | B |
|---|---|---|---|---|---|---|---|---|---|---|---|---|---|---|
| 50.0-55.0 | 17.0-21.0 | balance | 2.8-3.3 | 4.75-5.5 | 1 | 0.35 | 0.2-0.8 | 0.65-1.15 | 0.3 | 0.35 | 0.08 | 0.015 | 0.015 | 0.006 |

ROD END HAVING WEAR MITIGATION FEATURES FOR AN AUGMENTER NOZZLE ON A JET ENGINE TURBINE

CROSS REFERENCE TO RELATED APPLICATIONS

This application claims the benefit of U.S. Provisional Patent Application No. 61/967,065 filed on Apr. 16, 2015, and U.S. Provisional Patent Application No. 62/177,147 filed on Aug. 7, 2015 the contents of both of which are incorporated herein by reference in their entireties.

TECHNICAL FIELD

The present invention is directed to a rod end for use on an augmenter nozzle on a jet engine turbine, and more particularly to a rod end having wear mitigation features including one or more contoured side faces, a self-lubricating liner, and a bearing manufactured from an austenitic, corrosion resistant steel with a high chromium content for wear resistance and a controlled amount of nitrogen disposed therein.

BACKGROUND

Spherical plain bearings typically comprise an inner member or ball positioned for rotational movement in an outer member or outer ring. The outer ring defines an inner surface contoured to receive and retain the ball therein. In one type of spherical plain bearing, an integral ball is permanently held in place by forming metal around it by, for example, swaging or coining. Alternatively, a linkage apparatus such as a rod end may have an integral ball installed therein by swaging or coining. In another type of spherical bearing, the outer ring may be constructed with a slot to permit insertion of the ball and such bearings are commonly referred to as "load slot bearings." Alternatively, a linkage apparatus such as a rod end may have an integral ball installed therein via an entry slot machined into a face of the rod end.

Bearings in which there is metal-on-metal contact are generally used in environments in which marked variations in pressure, temperature, and high frequency vibrations are experienced. However, such variations in pressure, temperature, and high frequency vibrations can result in the bearing exhibiting high levels of wear. Moreover, high-cycle metal-on-metal contact or engagement within a short range-of-motion exacerbates the high levels of wear. Also, in these environments, foreign objects can impinge on the bearings, and contaminants such as dust, dirt, water, and aerospace fluids can be encountered, all of which can contribute to bearing wear. Additionally, high temperatures and pressures can cause severe oxidation or other forms of corrosion on the metal surfaces. This may cause a condition known as galling, leading to abrasive wear and an erosion of material.

To overcome such wear, Stellite materials and cobalt materials are typically used for manufacture of the inner member. However, neither Stellite materials nor cobalt materials have a high enough capacity for elongation to prevent the inner member from cracking under stress. A bearing with both the wear resistance of Stellite materials and cobalt materials and a high enough capacity to prevent the ball from cracking under stress has long been sought in the art. By analyzing round beams in bending, for example pins and bolts as examined by Roark and Young, a certain amount of bending stress and strain is forced into the inner member or a ball 14 of the bearing 10. FIG. 24 provides an exemplary beam deflection analysis. Alloys lacking elongation (or toughness or ductility) will crack or fracture readily, such as the brittle Stellite 3 or Stellite 6 materials having only 1% elongation. If the inner member or ball 14 is not integral with the housing 112 of the head portion 114 of the rod end 104, bushings or spacers are used. These additional components increase cost and require additional inventory to be purchased and maintained. These components further pose a foreign object damage risk during assembly of the linkage apparatus 100, the clevis joint 30, or the clevis joint within exhaust nozzle of a gas turbine engine.

A linkage apparatus or a rod end typically includes a link body shall that terminates in a head portion that defines a housing for a bearing, such as a spherical bearing. The housing is typically defined by a cylindrical interior surface. A spherical bearing installed therein typically includes a one-piece outer member or ring swaged, coined or otherwise formed around the inner member or ball. The inner member typically includes a linking shaft axially extending therethrough or integral therewith. The outer ring of the spherical bearing often has a cylindrical exterior surface complementary to the cylindrical interior surface of the housing. Rod ends can be secured to a clevis joint via the linking shaft positioned through the bearing and press fit into bores in the clevis joint. A face or corner of the rod end of the linkage apparatus may contact the inner wall of the clevis. This may also cause galling resulting in a loss of mass and weakening the structure. The linkage apparatus may also cycle back and forth, building up kinetic energy, excited by driven vibrations, leading to impact damage when the face corner strikes the clevis.

As depicted in FIG. 1A, a typical or prior art linkage apparatus 1100 includes a link body 1110 having a first rod end 1114 extending from one end thereof a second rod end 1114' extending from an opposing end thereof. The first rod end 1114 is secured to a double shear clevis joint having two flanges 1120A and 1120A' via a linking shaft 1130 positioned through a bearing 1140 and press fit into bores 1122 in the clevis joint flanges 1120A and 1120A'. The second rod end 1114' is secured to a single shear clevis having one flange 1120B via a linking shaft 1130' positioned through a bearing 1140' and press fit into bore 1122' in the clevis joint flange 1120B. The bearing 1140 is positioned within a cavity 1112 of a rod end 1114 and the bearing 1140' is positioned within a cavity 1112' of the rod end 1114'. As further depicted in FIG. 1C, the bearing 1140 includes an inner member 1142 (e.g., a truncated ball having a spherical surface) having a bore 1141 extending therethrough and positioned within an outer member 1144. An internal surface 1143 is defined by the bore 1141. As clearance develops between the internal surface 1143 and the inner member 1144 of the bearing 1140, or vector loading causes a neutation of a link body 1110A in the direction of the arrow Q1 (see FIG. 1B) and a tilting around the inner member 1142. In this type of movement, the link body 1110 is said to misalign.

As further depicted in FIGS. 1C, 1D and 1E the link body has a longitudinal axis A1. The prior art rod ends 1114 and 1114' have two flat opposing parallel axial faces 1116 (i.e., axial with respect to axis A6) formed (e.g., milled) thereon. Each of the axial faces 1116 is spaced apart from and aligned with respective inner surfaces 1120X and 1120X' of the flanges 1120A and 1170A', respectively, as shown in FIG. 1E. As shown in FIG. 1F, when the rod end 1114 and link body 1110 are rotated about the longitudinal axis, for example in the direction of the arrow R1, the rod end becomes misaligned by an angle δ1. The misalignment causes each of the axial faces 1116' (shown in dotted lines) to accelerate and impact the respective inner surface 1120X and 1120X' of the respective flange 1120A and 1120B of the double shear clevis. Such contact causes galling 1150 as shown in FIGS. 1C and 1F.

As illustrated in FIGS. 1G and 1H, attempts have been made to employ narrow anti-rotation lugs 1118A and/or 1118B formed on one or both axial faces 1116 of the rod end 1114. The anti-rotation lug 1118A exhibits a flat top configuration and the anti-rotation lug 1118B exhibits a sharp radius profile. In addition, the anti-rotation lugs 1118A and 1118B have a relatively narrow width W1 that is less than a width W2 of an end of the bearing 1140 and less than a width W3 extending longitudinally across the flat surface 1116. However, the prior art anti-rotation lugs 1118A and 1118 B are milled and consequently exhibit troublesome tooling lines and geometries that create stress risers leading to premature fatigue failures.

SUMMARY OF THE INVENTION

In one aspect, the present invention resides in a rod end that includes a shaft and a head extending from the shaft. The head has an opening extending therethrough. The rod end includes a spherical bearing rotatably disposed in the opening. The spherical bearing is manufactured from an austenitic stainless steel alloy (e.g. Nitronic® 60) that includes 16 to 17 weight percent chromium and 0.1 to 0.18 weight percent nitrogen.

In another aspect, the present invention resides a rod end that includes a shaft having a longitudinal axis and a head extending from a junction end of the shaft to a distal edge defined by the head. The head has an opening extending between a first axial face and a second axial face thereof. The first axial face has one or more non-zero radius of curvature. The second axial face is flat.

In another aspect, the present invention resides in a rod end that includes a shaft having a longitudinal axis and a head extending from a junction end of the shaft to a distal edge defined by the head. The head had an opening extending between a first axial face and a second axial face thereof. The first axial face and the second axial face each have one or more non-zero radius of curvature.

In another aspect, die present invention resides in a rod end that includes a shaft having a longitudinal axis and a head extending from a junction end of the shaft to a distal edge defined by the head. The head has an opening extending between a first axial face and a second axial face thereof. The first axial face and the second axial face are flat and have a self-lubricating liner disposed thereon.

In yet another aspect, the present invention resides in a linkage apparatus that includes a shaft having a longitudinal axis and a first end and a second end. A first rod end is secured to the first end of the shaft and a second rod end secured to the second end of the shaft. The first rod end includes a first head extending from the first end of the shaft to a first distal edge defined by the first head. The first head has a first opening extending between a first axial face and a second axial face thereof. The second rod end includes a second head extending from the second end of the shaft to a second distal edge defined by the second head. The second head has a second opening extending between a third axial face and a fourth axial face thereof. The first axial face and the third axial face are positioned on diametrically opposing sides of the linkage apparatus. The second axial face and the fourth axial face are positioned on diametrically opposing sides of the linkage apparatus. The first axial face and the third axial face each have one or more non-zero radius of curvature. The second axial face and the fourth axial face are flat.

BRIEF DESCRIPTION OF APPENDED DRAWINGS

FIG. 15 is a top view of the head portion of the rod end the linkage apparatus of the FIG. 4 having a liner disposed thereon;

FIG. 16 is a perspective view of the head portion of the rod end of FIG. 15;

FIG. 17 is a side view of the head portion of the rod end of FIG. 15;

FIG. 21 is tables listing certain wear characteristics of NITRONIC® 60 and Stellite™ 6.

FIG. 22 is a table listing the composition of NITRONIC® 60.

FIG. 23 is a table comparing the wear compatibility of certain alloys listed therein;

FIG. 24 is an exemplary beam deflection analysis;

FIG. 27 is a table showing the chemical composition of Inconel®18.

DETAILED DESCRIPTION

The present invention incorporates the use of machined features and self-lubricating composites to reduce or eliminate premature wear and impact damage on a linkage apparatus and a clevis or other link to which the linkage apparatus is mounted. The linkage apparatus forms a rod end in connection with a moveable structural member of a gas turbine engine and having a bearing positioned within the rod end. Additional lubrication features are incorporated on the link faces to prevent premature wear damage to the axial faces of the linkage apparatus and the inner clevis walls where the links are attached or mounted thereto. One embodiment of the linkage apparatus of the present invention includes a rod end exhibiting one smooth profiled axial face (e.g., a radiused axial face) and one flat machined face opposite the smooth profiled axial face. One embodiment of the linkage apparatus of the present invention includes a rod end exhibiting two smooth profiled axial face (e.g., a radiused axial face), one on each opposing axial face. One embodiment of the linkage apparatus of the present invention further includes a self lubrication composite bonded to the profiled axial face of the rod end having an integral ball positioned therein. One embodiment of the linkage apparatus of the present invention includes a bearing mounted in the rod end thereof, the bearing having an inner member fabricated from an austenitic, corrosion resistant steel with a high chromium content for wear resistance and a controlled amount of nitrogen, such as for example NITRONIC® 60. (NITRONIC® is a registered trademark owned by AK Steel Corporation.)

Figure 1A:
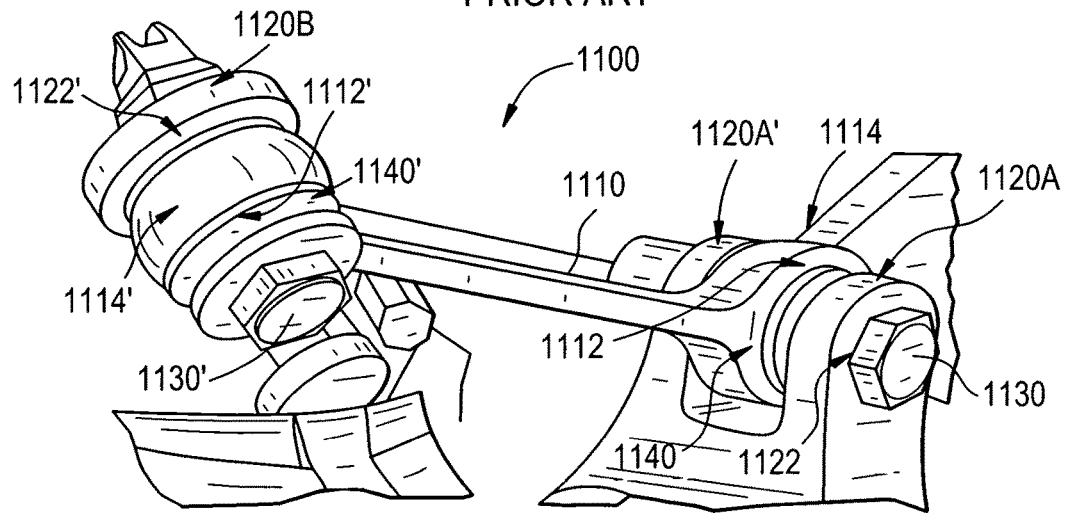
FIG. 1A is a perspective view sketch of a prior art linkage apparatus having a bearing installed on each of two rod ends thereof.
Figure 1B:
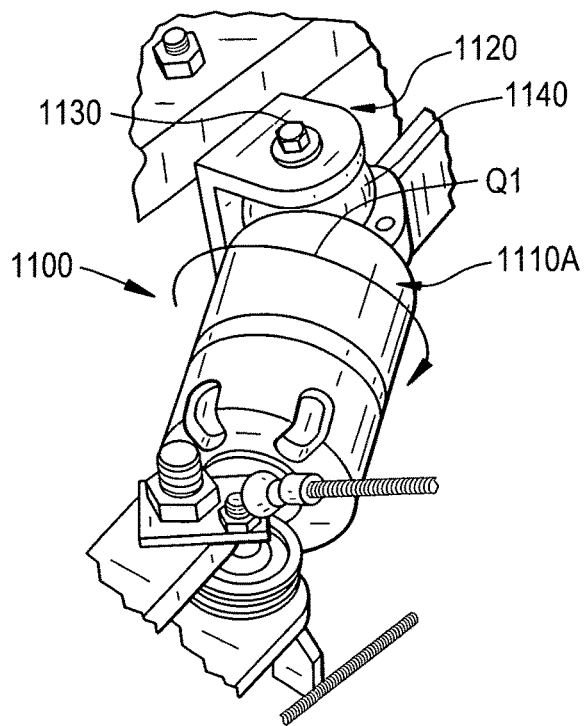
FIG. 1B is a perspective view sketch of another prior art linkage apparatus exhibiting a misaligned configuration.
Figure 1C:
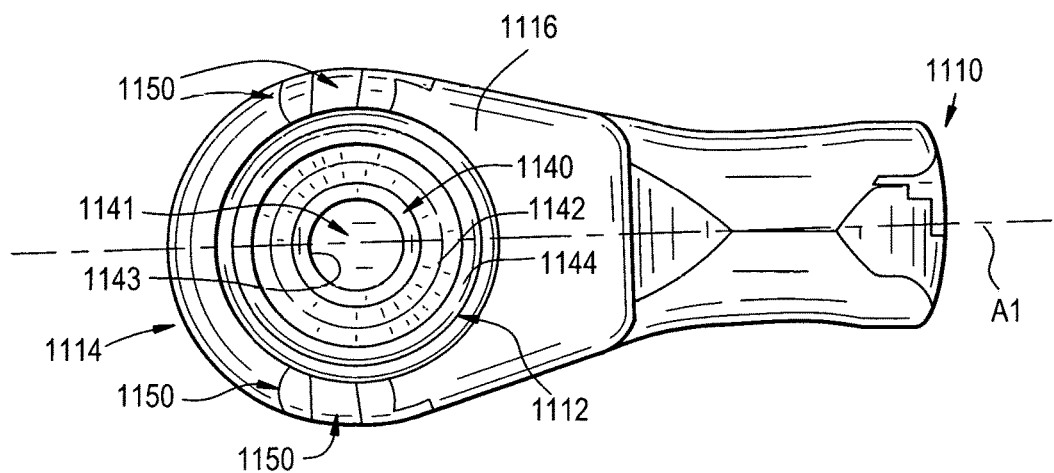
FIG. 1C is a side view sketch of the prior art linkage apparatus of FIG. 1A having a rod end exhibiting wear damage caused by the misaligned configuration of FIGS. 1B and 1F.
Figure 1D:
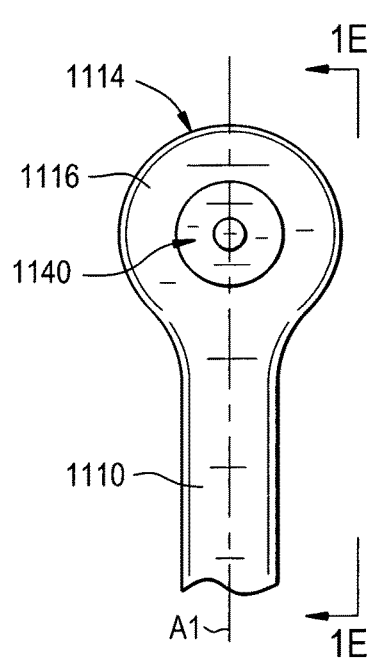
FIG. 1D is a side view of a prior art rod end having flat opposing side surfaces.
Figure 1E:
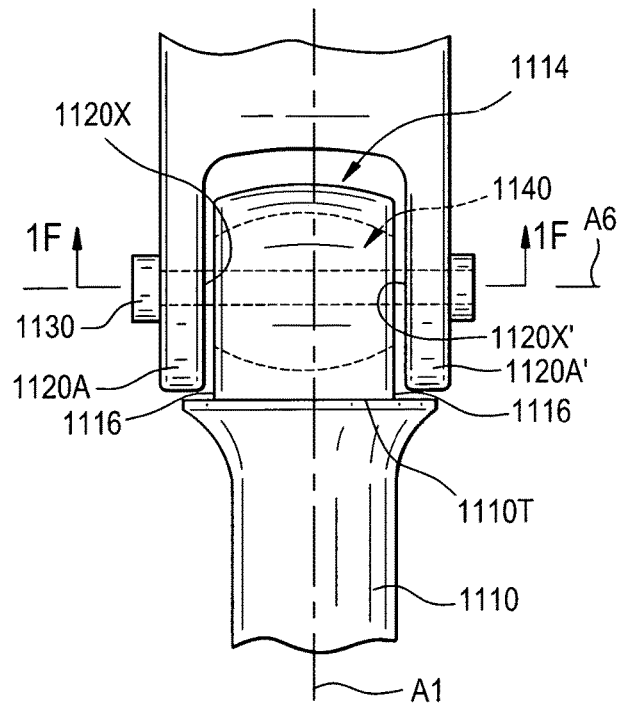
FIG. 1E is a is a front view of the prior art rod end of FIG. 1D taken across line 1E-1E and shown mounted in a double shear clevis.
Figure 1F:
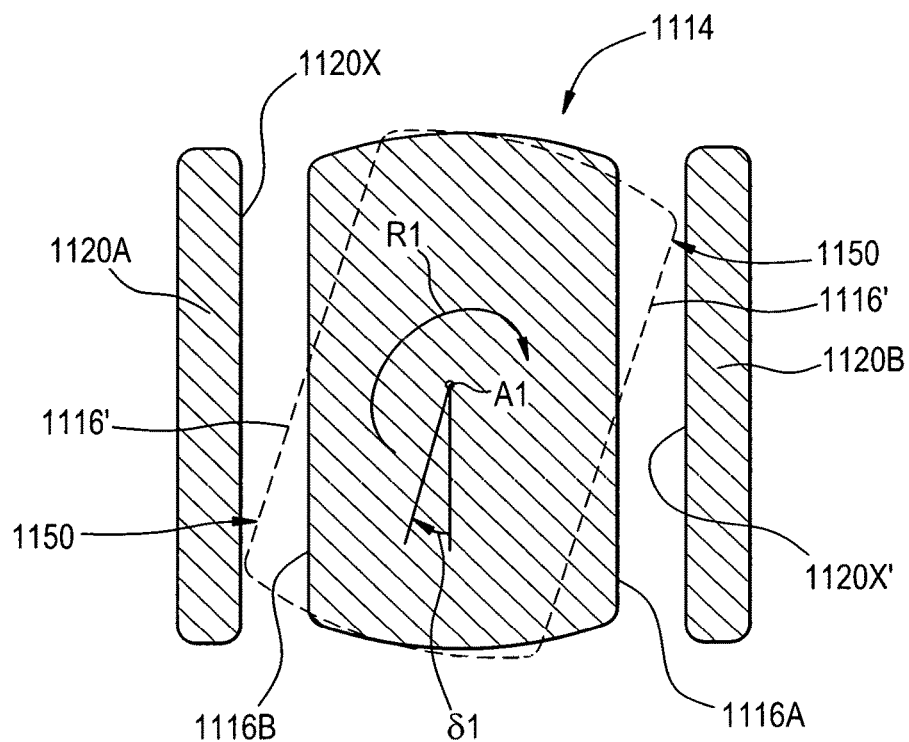
FIG. 1F is a cross sectional view of the prior art rod end of FIG. 1E taken across line 1F-1F and illustrating a rotational misalignment.
Figure 1G:
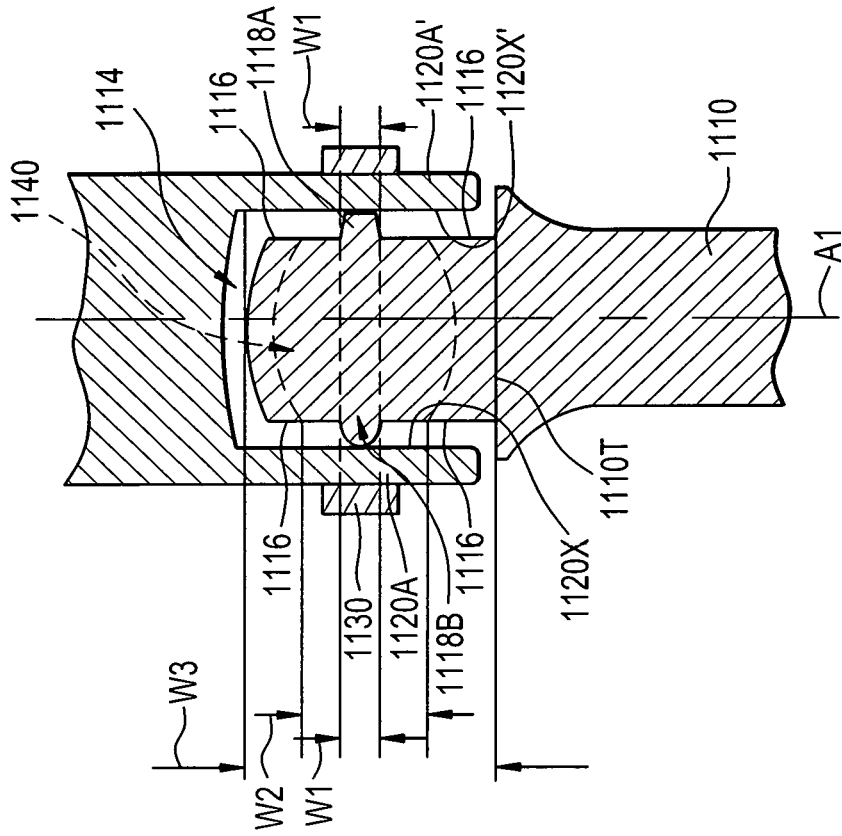
FIG. 1G is a side view of a prior art rod end having flat opposing side surfaces with centrally located anti-rotation lugs.
Figure 1H:
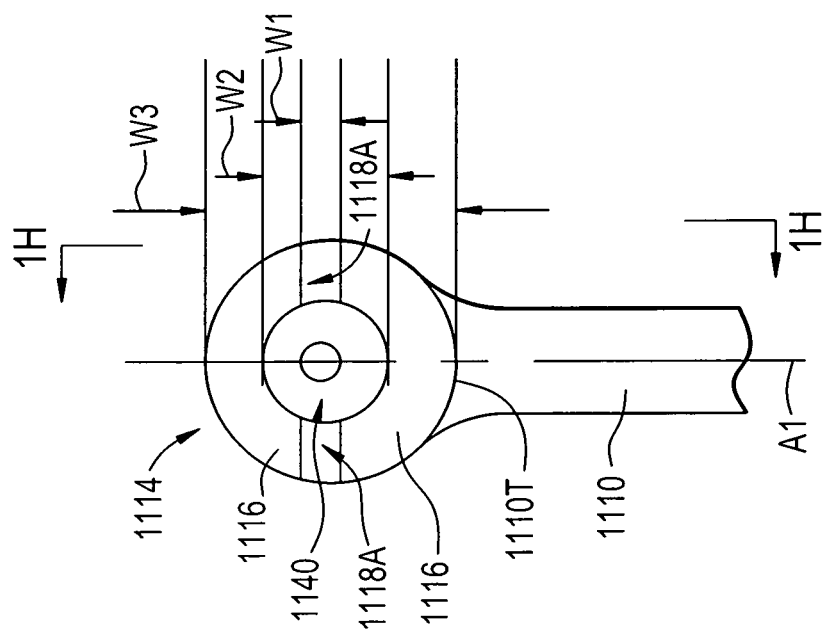
FIG. 1H is a is a front view of the prior art rod end of FIG. 1G taken across line 1H-1H and shown mounted in a double shear clevis.
Figure 2A:
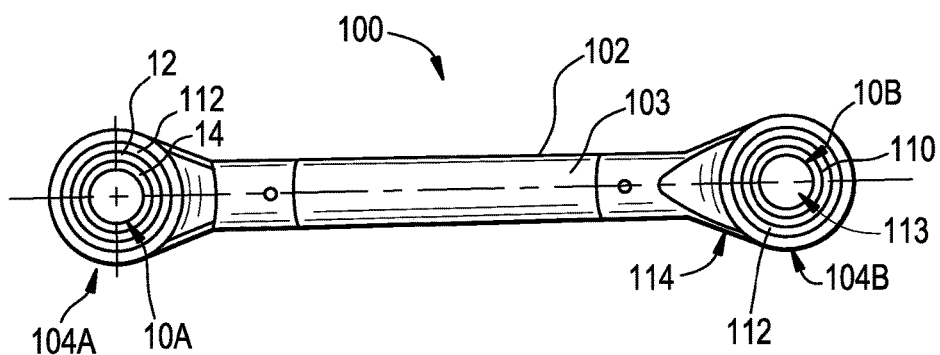
FIG. 2A is a top view of a linkage apparatus of the present invention.
Figure 2B:
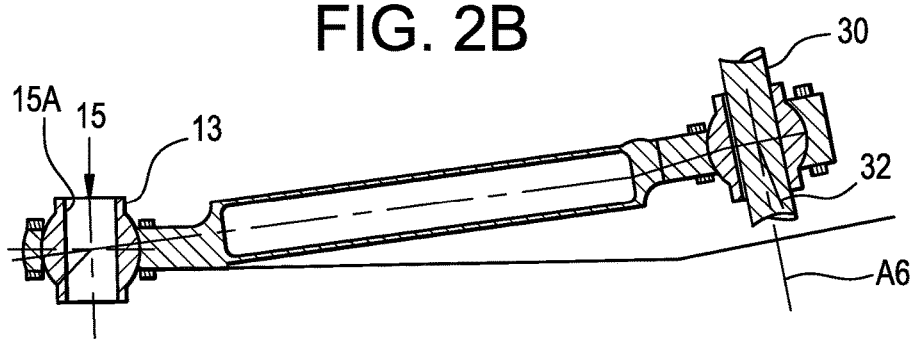
FIG. 2B is a sectional side elevation view of one embodiment of the linkage apparatus of FIG. 2A.

As shown in FIGS. 2A and 2B to 2, a linkage apparatus 100 of the present invention defines a link body 102 including a link body shaft 103 that includes a first rod end 104A on one end of the link body shaft 103 and a second rod end 104B on an opposite end of the link body shaft 103. The first rod end 104A defines a head portion 114 which includes a housing 112 having a bore 113 therethrough. The second rod end 104A defines a head portion 114 which includes a housing 112 having a bore 113 therethrough. A first bearing 10A (e.g., a spherical bearing having a truncated ball as an inner member) is disposed for rotation in the housing 112 of the first rod end 104A. A second bearing 10B (e.g., a spherical bearing having a truncated ball as an inner member) is disposed for rotation in the housing 112 of the second rod end 104B. Each of the first bearing 10A and the second bearing 10B include an outer member 12 swaged, coined or otherwise formed around an inner member 14. In one embodiment, the housing 112 is swaged, coined or otherwise formed around an inner member or ball 14. The inner member 14 includes integral hubs 13 and a bore 15 extending therethrough for a linking shaft 30 positioned therein or formed integral therewith.

The inner surface 15A defined by the bore 15 of the inner member 14 engages an external surface 32 of the linking shaft 30 positioned therein. The outer ring of the respective one of the first bearing 10A and the second bearing 10B defines a cylindrical exterior surface complementary to a cylindrical interior surface of the housing 112 of the respective rod end 104A and 104B. The length of the link body 102 is adjustable or may exhibit a fixed length, and the bearing is sized to suit the particular housing 112 of the head portion 114 of the rod end 104 and the linking shaft 30. The linking shaft 30 is press fit within, or otherwise integrally formed with, the internal surface 15A of the bore 15.

Figure 3:
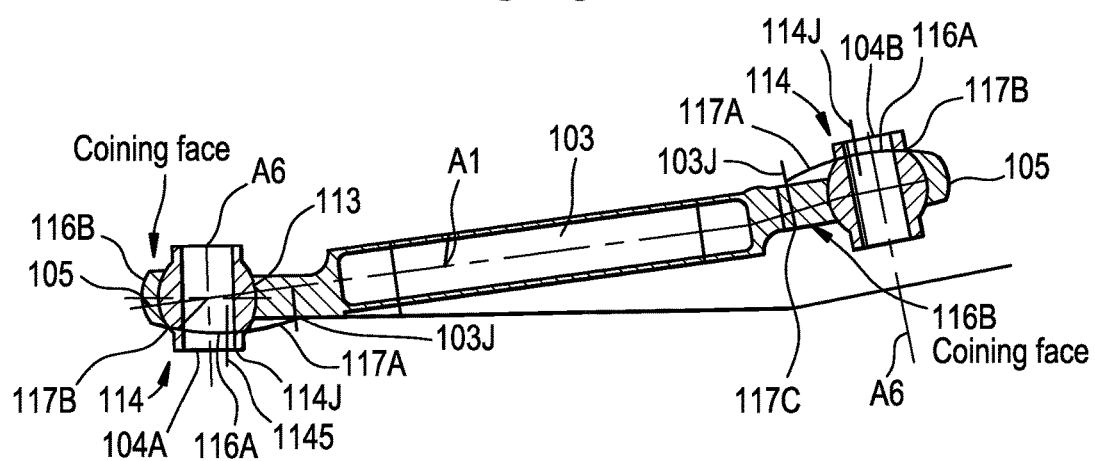
FIG. 3 is a sectional side elevation view of another embodiment of the linkage apparatus of FIG. 1.
Figure 4:
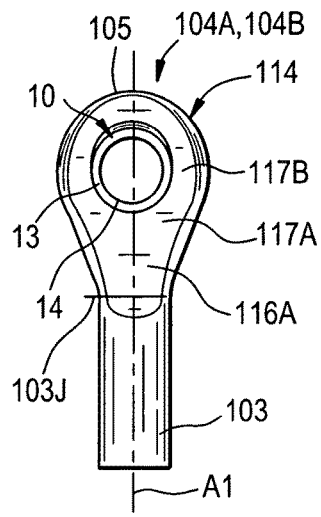
FIG. 4 is a top view of the head portion of the rod end the linkage apparatus of the FIG. 1 having an axial surface with a radiused profile.
Figure 5:
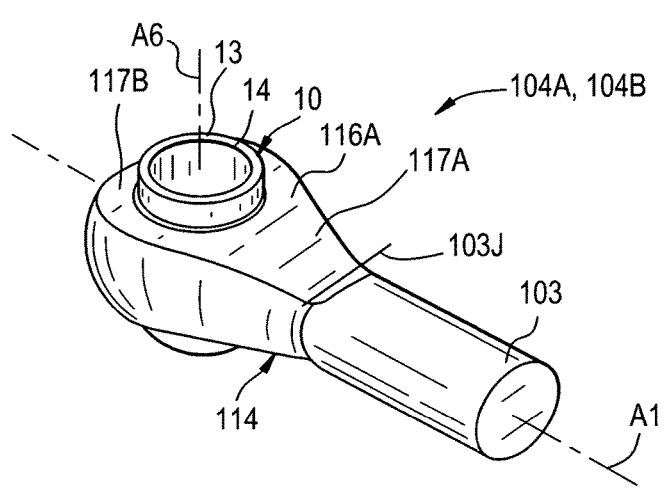
FIG. 5 is a perspective view of the head portion of the rod end of FIG. 4.

In one embodiment of the present invention, and as depicted in FIGS. 3 to 7, the respective head portion 114 of each of the first rod end 104A and second rod end 104B defines: 1) a first axial face 116A (i.e., axial with respect to axis A6) having a radiused profile (i.e., radius of curvature) extending continuously from a junction line 103J of the link body shaft 103 to a distal edge 105 of the head portion 114; and 2) a second axial face 116B defining a substantially flat profile 117C substantially parallel to a central axis A1 of the link body shaft 103 extending continuously from the junction line 103J of the link body shaft 103 to the distal edge 105 of the head portion 114. The second axial face 116B is located opposite the first axial surface 116A, of the respective first rod end 104A and the second rod end 104B. In one embodiment, the first axial face 116A is defined by a first radius of curvature 117A that extends from the junction line 103J to an intermediate junction line 114J positioned between the first junction line 103J and the distal edge 105; and second radiused of curvature 117B extending from the intermediate junction line 114J to the distal edge 105 of the head portion 114. In one embodiment, the intermediate junction line 114J is located between 40 and 60 percent of a total distance between the junction line 103J and the distal edge 105. In one embodiment, the first axial face 116A is milled on an arc radius to provide the first radius of curvature 117A and the second radius of curvature 117B. In one embodiment, the second axial face 116B is formed by a coining operation. In one embodiment, the first axial surface 116A of the first rod end 104A is diametrically opposite the first axial surface 116A of the second rod end 104B, as shown in FIG. 3.

Figure 7A:
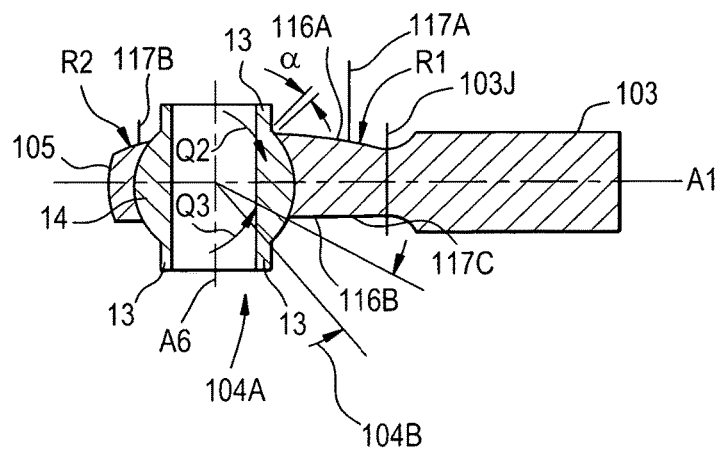
FIG. 7A is a side sectional of the head portion of the rod end of FIG. 4.
Figure 7B:
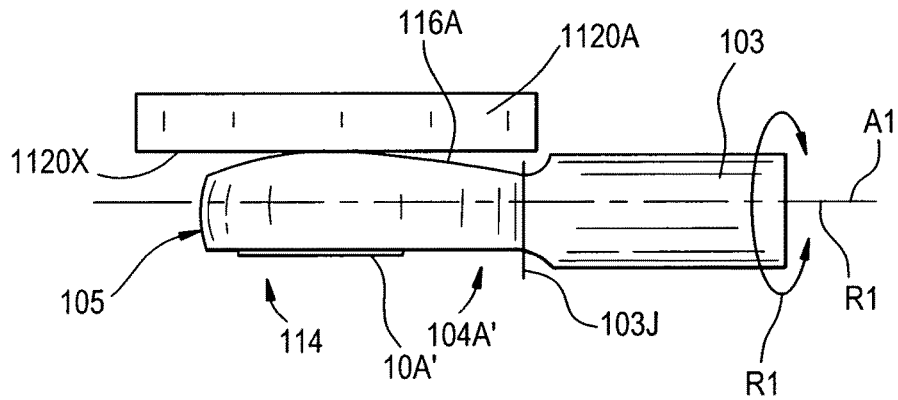
FIG. 7B is a side view of the head portion of the rod end of FIG. 6 shown in a neutral position with respect to a reference plane and with one axial surface engaging an inner surface of a clevis flange.
Figure 7C:
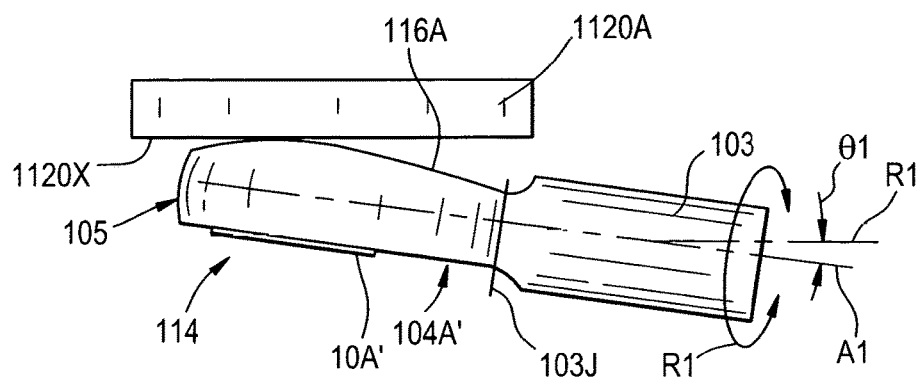
FIG. 7C is a side view of the head portion of the rod end of FIG. 6 shown in a downwardly misaligned position with respect to a reference plane and with one axial surface engaging an inner surface of a clevis flange.
Figure 7D:
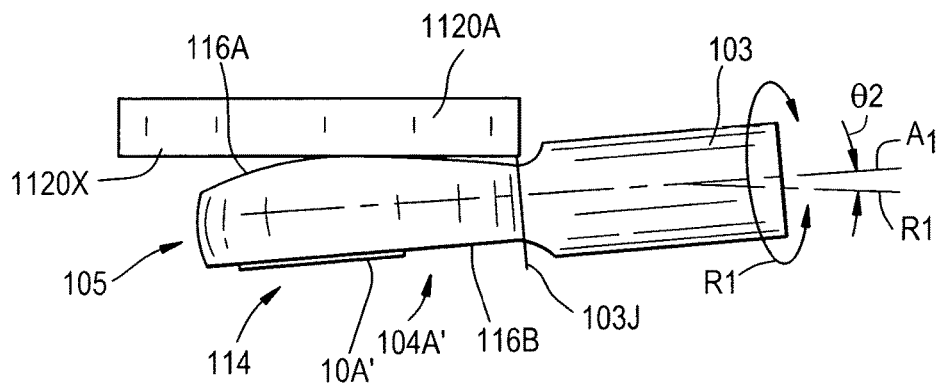
FIG. 7D is a side view of the head portion of the rod end of FIG. 6 shown in a upwardly misaligned position with respect to a reference plane and with one axial surface engaging an inner surface of a clevis flange.
Figure 7E:
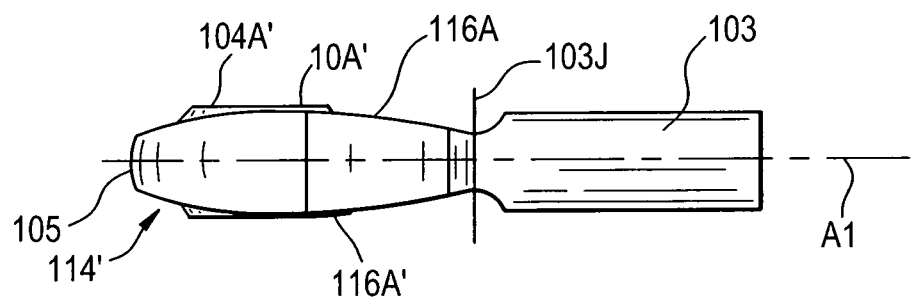
FIG. 7E is side view of another embodiment showing the rod end with a radiused profile on both opposing axial faces of the rod end.
Figure 8:
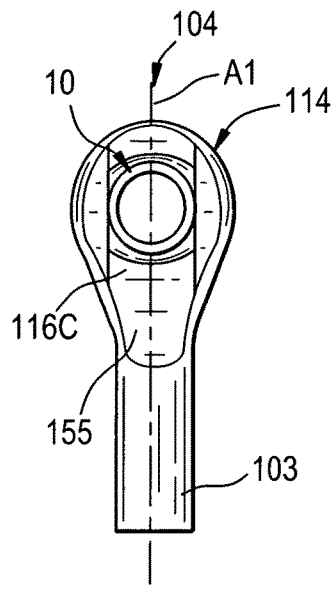
FIG. 8 is a top view of the head portion of the rod end the linkage apparatus of the FIG. 4 having wherein the radiused axial surface includes a channel therein.
Figure 9:
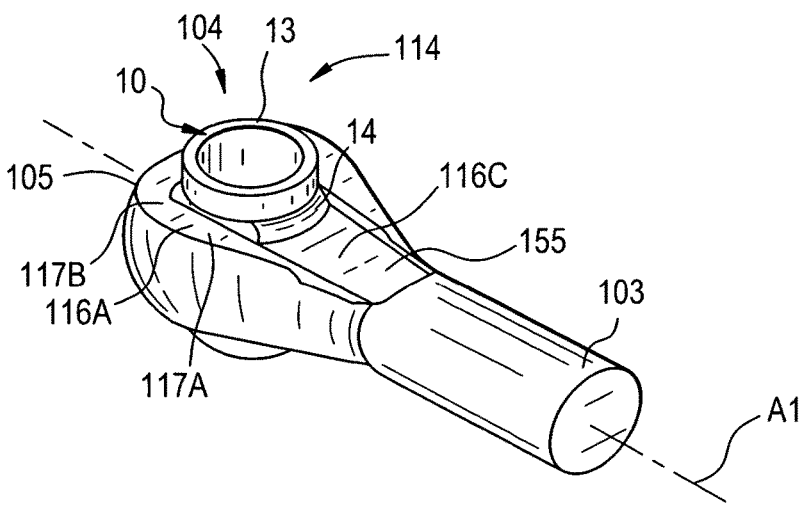
FIG. 9 is a perspective view of the head portion of the rod end of FIG. 8.

In one embodiment, as shown in FIG. 7E, 1) one axial side of the rod end 104A' has the first axial face 116A having the radiused profile (i.e., radius of curvature) extending continuously from the junction line 103J of the link body shaft 103 to a distal edge 105 of the head portion 114'; and 2) an opposite axial side of the rod end 104A' has the first axial face 116A' having the radiused profile (i.e., radius of curvature) extending continuously from the junction line 103J of the link body shaft 103 to a distal edge 105 of the head portion 114'. The rod end 104A' has no hub 13 extending from the bearing 10A'.

Referring to FIGS. 7B, 7C and 7D, the rod end 104A' includes a bearing 10A' that has no hub 13 extending therefrom. The rod ends 104A' are shown in various angles of engagement with an inner surface 1120X of a clevis flange 1120A. In FIG. 7B, the head portion of the rod end 104A' is shown in a neutral position such that the longitudinal axis A1 and a reference plane R1 are coplanar. In the neutral position, a central portion of the axial surface 116A engages the inner surface 1120X of the clevis flange 1120A thereby impeding rotational movement of the rod end 104A' about the longitudinal axis A1 in response to application of a torque to the link body shaft 103 as indicated by the arrow R1.

In FIG. 7C, the head portion of the rod end 104A' is shown in a downwardly misaligned position such that the longitudinal axis A1 and the reference plane R1 are at an angle θ1 relative to one another. In the downwardly misaligned position, a portion of the axial surface 116A proximate the distal edge 105 engages the inner surface 1120X of the clevis flange 1120A thereby impeding rotational movement of the rod end 104A' about the longitudinal axis A1 in response to application of a torque to the link body shaft 103 as indicated by the arrow R1.

In FIG. 7D, the head portion of the rod end 104A' is shown in a upwardly misaligned position such that the longitudinal axis A1 and the reference plane R1 are at an angle θ2 relative to one another. In the upwardly misaligned position, a portion of the axial surface 116A proximate the junction line 103J engages the inner surface 1120X of the clevis flange 1120A thereby impeding rotational movement of the rod end 104A' about the longitudinal axis A1 in response to application of a torque to the link body shaft 103 as indicated by the arrow R1.

The first axial face 116A having the radiused profile, first of curvature 117A and the second radius of curvature limit the rotational misalignment and acceleration (in the direction of the arrow R1 shown in FIGS. 7B, 7C and 7D) first rod end 104A and the second rod end 104B relative to the clevis flanges 1120A, 1120A' and 1120B. In contrast, a larger range of motion, or an unimpeded range of motion, causes a building up of kinetic energy that causes long term impact damage when the first axial face 116A strikes the clevis flanges 1120A, 1120A' and 1120B, or other linkage apparatus mount. The kinetic energy that develops during oscillations having the unimpeded range of motion is analogous to a hammer being swung through a large degree of motion thereby causing more damage than the same hammer swinging through a smaller degree of motion.

As shown in FIG. 7A, during a range of misalignment of the inner member 14 relative to the rod end 104A in the direction of the arrow Q2, the hub 13 engages the first axial face 116A and thereby delimits a misalignment angle α (e.g., about 2 degrees, or about 1-3 degrees) thus impeding the range of motion of the hub 13 relative to the first axial face 116A. As shown in FIG. 7A, during a range of misalignment of the inner member 14 relative to the rod end 104A in the direction of the arrow Q3, the hub 13 engages the second axial face 116B and thereby delimits a misalignment angle β (e.g., about 20 degrees or about 19 to 21 degrees) thus impeding the range of motion of the hub 13 relative to the second axial surface 116B.

In one embodiment, referring to FIG. 7A, the misalignment angle α ranges from about 3° to about 10°. In one embodiment, referring to FIG. 7A, the misalignment angle α ranges from about 40 to about 5°. In one embodiment, referring to FIG. 7A, the misalignment angle α is 4.2°. In one embodiment, referring to FIG. 7A, the misalignment angle β ranges from about 5° to about 45°. In one embodiment, referring to FIG. 7A, the misalignment angle β ranges from about 15° to about 25°. In one embodiment, referring to FIG. 7A, the misalignment angle β is 20.2°.

The first radius of curvature 117A of the head portion 114 is designated by the arrow R1 and the second of curvature 117B defines is designated by the arrow R2. In one embodiment, the first radius of curvature 117A (i.e., R1) ranges from about one inch to about four inches. In one embodiment, the first radius of curvature 117A (i.e., R1) ranges from about two inches to about three inches. In one embodiment, the first radius of curvature 117A (i.e., R1) is about 2.5 inches. In one embodiment, the second radius of curvature 117B (i.e., R2) ranges up to about two inches. In one embodiment, the second radius of curvature 117B (i.e., R2) is about one inch.

In one embodiment of the present invention, and as depicted in FIGS. 8 to 11, the head portion 114 of rod end 104 defines a channel 155 extending axially inwardly from the first axial face 116A having the first radius of curvature 117A and the second radius of curvature 117B. The channel 155 is located between lateral sides of the head 114 and is aligned with the ling body shaft 103 and the inlet member 14. The channel 155 defines a third axial face 116C substantially parallel to a central axis A1 of the link body shaft 103. In one embodiment, the channel extends from adjacent the link body shaft 103 at junction 103J to the edge 105 of the head portion 114 of the rod end 104. The channel 155 accommodates a greater range of motion of the bearing along one axis thereby accommodating rotational movement of the inner member 14 and axial movement in one direction of the hub 13. In one embodiment, the channel 155 is tapered at an angle relative to the central axis A1.

Figure 11:
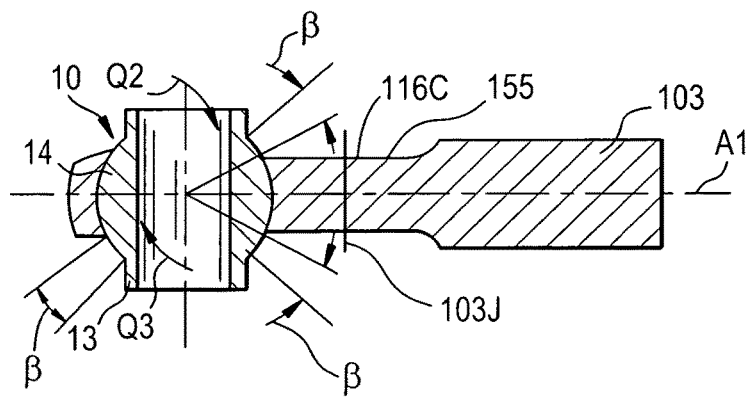
FIG. 11 is a side sectional of the head portion of the rod end of FIG. 8.

As shown in FIG. 11, during a range of misalignment of the inner member 14 relative to the rod end 104A in the direction of the arrow Q2, the hub 13 engages the third axial face 116C and thereby delimits a misalignment angle β (e.g., about 20 degrees or about 19 to 21 degrees) thus impeding the range of motion of the hub 13 relative to the third axial face 116C. As shown in FIG. 11, during a range of misalignment of the inner member 14 relative to the rod end 104A in the direction of the arrow Q3, the hub 13 engages the second axial face 116B and thereby delimits a misalignment angle β (e.g., about 20 degrees or about 19 to 21 degrees) thus impeding the range of motion of the hub 13 relative to the second axial surface 116B.

In one embodiment, referring to FIG. 11, the misalignment angle β ranges from about 5° to about 45°. In one embodiment, referring to FIG. 11, the misalignment angle β ranges from about 15° to about 25°. In one embodiment, referring to FIG. 11, the misalignment angle β is 20.2°.

Figure 12:
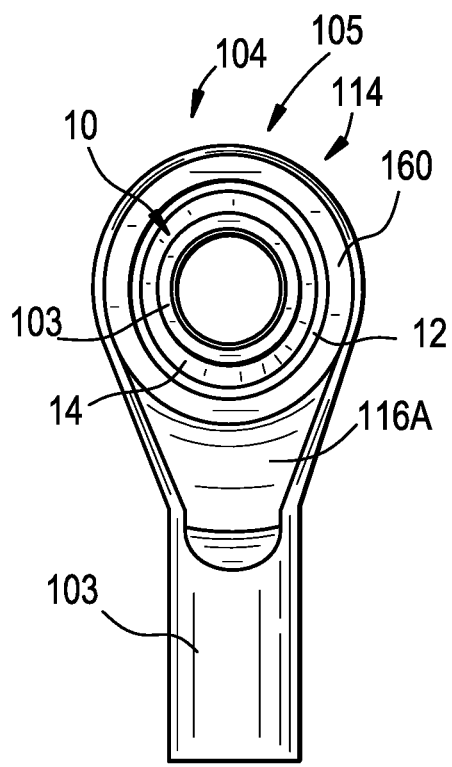
FIG. 12 is a top view of the head portion of the rod end the linkage apparatus of the FIG. 1 having a liner disposed thereon.
Figure 13:
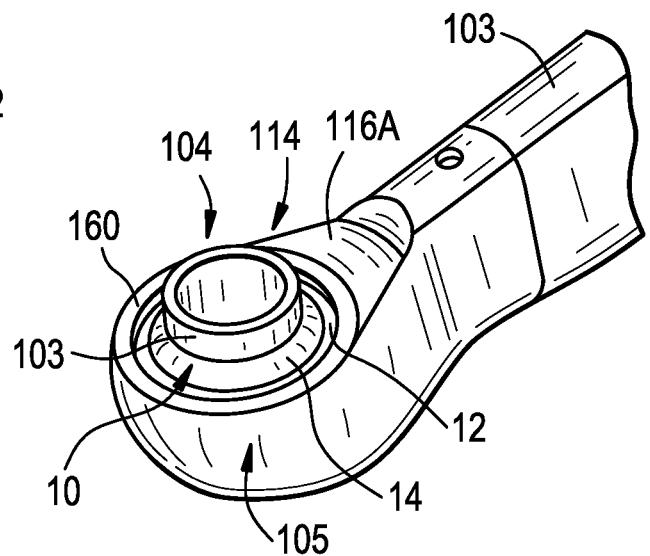
FIG. 13 is a perspective view of the head portion of the rod end of FIG. 12.
Figure 14:
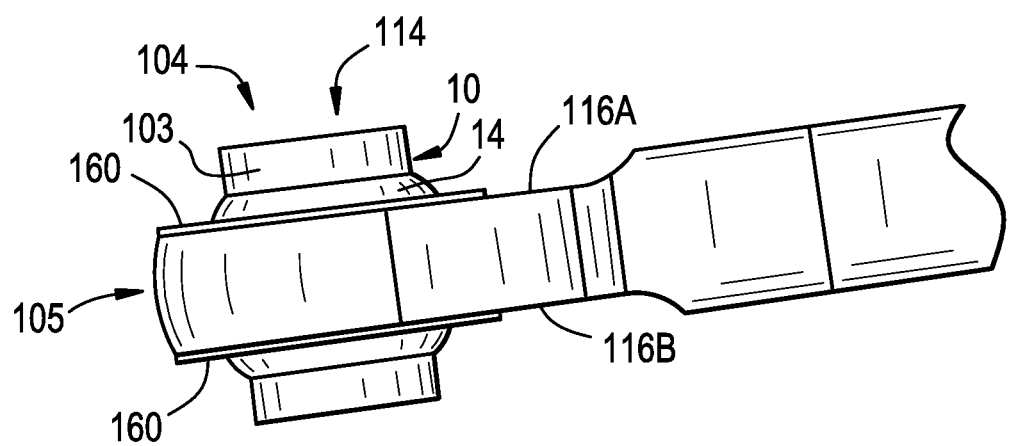
FIG. 14 is a side view of the head portion of the rod end of FIG. 12.

In one embodiment of the present invention, and as depicted in FIGS. 12 to 14, the head portion 114 of rod end 104 has head having an opening 114X extending between a first axial face 116A and a second axial face 116B of the head portion 114. A wear mitigation feature 160 is bonded to the first axial face 116A and the second axial face 116B. The wear mitigation feature 160 is a self-lubricating liner 160. The wear mitigation feature 160 has an area of a magnitude configured to prevent metal-to-metal contact with the first axial face 116A and the second axial face 116B. The wear mitigation feature 160 is disposed proximate the spherical bearing 10 disposed in the head portion 114 of the rod end 104. The spherical bearing 10 has an outer member 12 formed around an inner member 14 and the wear mitigation 160 feature is spaced apart from the inner member 14. In one embodiment, the wear mitigation feature extends from the opening 114X to a distal edge 115 of the head 114. In one embodiment, the wear mitigation feature 160 terminates at the opening 114X. The wear mitigation feature 160 (i.e., the self-lubricating liner) prevents metal-to-metal contact between mating surfaces, for example, between the first axial face 116A and an internal surface (e.g., surface 1120X FIG. 7B) of a clevis flange (e.g., clevis flange 1120 as shown in FIG. 7B) to which the rod end 104 is mounted as further described herein with reference to FIG. 18. Accordingly, wear between these mating surfaces is further reduced and the life of the linkage apparatus 100 is further extended.

In one embodiment of the present invention, and as depicted in FIGS. 15 to 17, the head portion 114 of rod end 104 includes the channel 155 and the self-lubricating composite liner 160 disposed on the first axial face 116A proximate the bore 113. In one embodiment, the self-lubricating liner 160 is fabricated from polytetrafluoroethylene (PTFE). In one embodiment, the self-lubricating liner 160 is a composite liner fabricated from PTFE with strengthening fibers such as fiber glass or steel fibers woven therein and is capable of withstanding operation at a temperature of 600 degrees Fahrenheit or greater.

Figure 18:
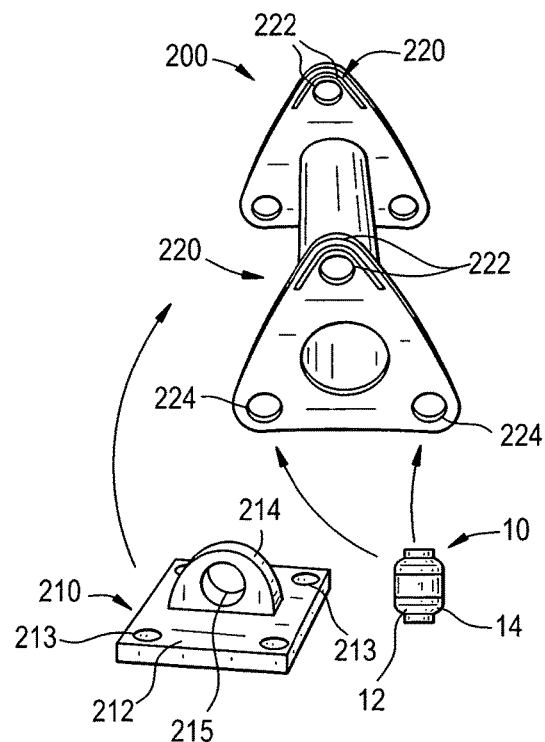
FIG. 18 is a perspective view of a clevis joint to which the linkage apparatus of FIG. 1 may be mounted.
Figure 19:
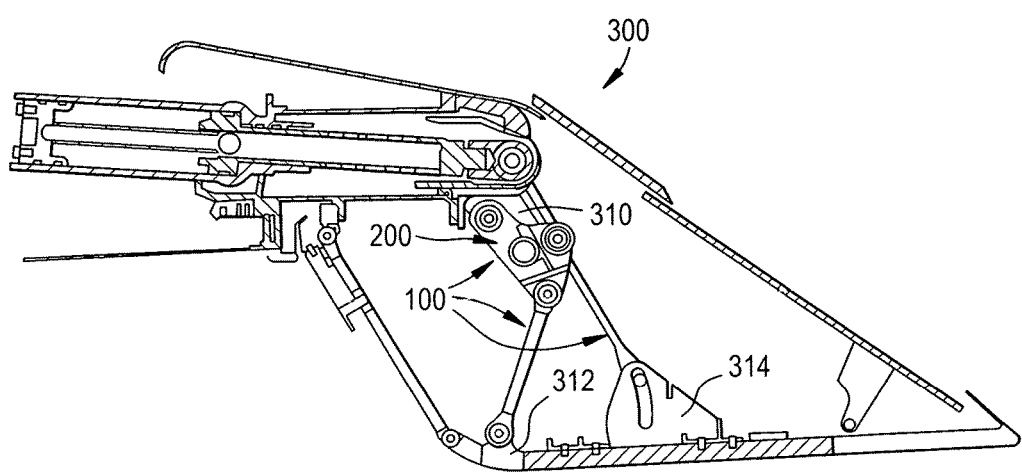
FIG. 19 is a depiction of an assembly of an exhaust nozzle of a gas turbine engine in which a linkage apparatus of the present invention in mounted within the clevis joint of FIG. 18.

In one embodiment and as shown in FIG. 18, a linkage apparatus 210 is secured to a clevis mount 220 of clevis joint 200 via the bearing 10. The linkage apparatus 210 defines a base 212 configured to be mounted to a structural member 310 of a gas turbine engine such as, for example, an exhaust nozzle or augmenter nozzle 300 of FIG. 19, wherein additional linkage apparatuses 100 may be mounted therein and secured to other structural members 312 and 314 of the augmenter nozzle 300 or other components of the gas turbine engine. In one embodiment, the base 212 defines a plurality of apertures 213 through which fasteners may be disposed to securely mount the linkage apparatus 210 to the structural member 310. The linkage apparatus 210 defines a mounting portion or head 214 extending outwardly from the base 212. In one embodiment, the head 214 extends substantially perpendicularly outwardly from the base 212. The head 214 defines an aperture 215 in which the bearing 10 is disposed. In one embodiment, the bearing 10 is positioned within the aperture by swaging the head 214 around the bearing 10. The linking shaft 30 (FIG. 3) is positioned through the bearing 10 and press fit into bores 222 in the clevis mount 220. The linking shaft 30 may be, for example, a center tube or an adjustable turnbuckle. In one embodiment, additional bearings 10 are disposed within one or more bores 214 of the clevis joint 200.

As a result of substantial testing, finite element analysis reveals that the head portion 114 defining the first axial face 116A having the first radiused profile 117A exhibits a lower stress concentration. The milling lines created during the traditional anti-rotation lugs (i.e., lugs 1118A and 1118B of FIG. 11H) that are disposed 90° to the applied load path are not present in the first radiused profile 117A of the first axial face 116A of the head portion 114 of the rod end 104 of the linkage apparatus 100 of the present invention thereby increasing fatigue life of the rod ends 104A and 104B of the present invention compared to prior art rod ends 1114 and 114' of FIGS. 1A and 1E.

Figure 20:
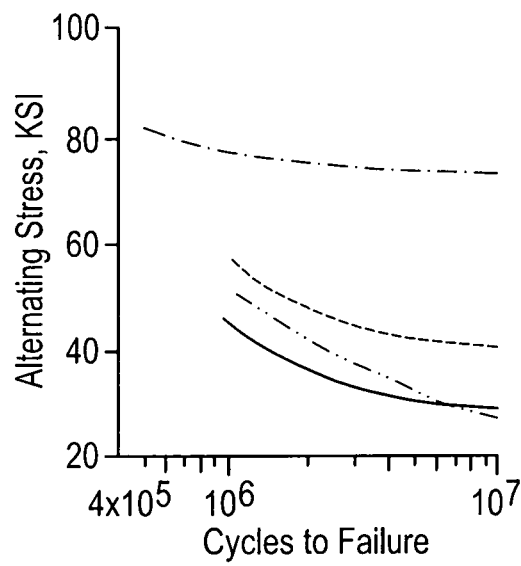
FIG. 20 is a graphical depiction of the effect of surface conditions on fatigue properties of a nickel-base alloy.

FIG. 20 provides a graphical depiction of the effect of surface conditions on fatigue properties of INCONEL® 718, cantilever bending, zero mean stress, at 24° C. (75° F.). (INCONEL® is a registered trademark owned by Huntington Alloys Corporation.) As shown in FIG. 20, poor surface finishes reduce fatigue life. The inventors have discovered that the milling of the anti-rotation lugs 1118A and 1118B of FIG. 1H, results in a poor surface finish and stress concentrations causing a reduced fatigue life. In contrast, the inventors have discovered that continuous arcuate axial surface 1116A of the rod ends 1114 and 1114' of the present invention can be formed by a smaller cutting tool such as for example an end mill to improve the surface finish thereby improving fatigue life. The inventors have also discovered that machining of the prior art anti-rotation lugs 1118A and 118B leaves tool lines 90 degrees to the applied load path in the rod end 1114 and 1114', leaving them in the 3 and 9 o'clock to 4 and 8 o'clock regions on the axial face 1116 (see FIG. 1H) which arc the highest stressed regions in tension loading. The fillet radius and the tool lines result in an inferior finish that pose a further threat to the integrity of the part relative to fatigue life. The inventors have discovered that the milling of the first axial surface 116A lessens the chances of producing a poor finish (i.e., a rough finish) because a larger tool can be used wherein such a larger tool is more rigid and capable of a greater range of feeds and speeds to permit greater surface finish controls (i.e., to provide a smoother finish which provides for longer fatigue life). Accordingly, the profile milling or machining of the entire rod end 104, or at least the first axial face 116A having the first radius of curvature 117A and/or the second radius of curvature 117B, permits the use of a larger cutting tool which is more robust and less likely to flex and chatter thereby causing poor surface finishes which reduce fatigue life as shown in FIG. 20.

In some applications, the rod ends and links are not clamped in the clevis, for example clevis mount 220, and may rotate about the ball face or translate along the mounting bolt or pin and strike the clevis. In one embodiment of the present invention, the inner member 14 is fabricated from NITRONIC® 60, an austenitic, corrosion resistant steel with a high chromium content (i.e., 16 to 17 wt %) for wear resistance, a controlled amount (i.e., 0.10 to 0.18 wt %) of nitrogen, 0.08 max wt % carbon, 7 to 9 wt % or 7.5 to 8.5 wt % manganese, 0.040 max wt % phosphorus, 0.030 or 0.01 max wt % sulfur, 3.7 to 4.2 silicon, and 8.0 to 8.5 wt % nickel. NITRONIC® 60 has tremendous elongation and ductility of over 30% compared to the less than 1% elongation of Stellite 6™ and is much more crack resistant.

In one embodiment the head portion 114 and the link body shaft 103 of the rod ends 104A and 104B are manufactured from an austenitic age hardenable nickel-chromium-based superalloy such as INCONEL® 718, having 50-55 wt % nickel and 17-21 wt % chromium and other elements as illustrated in FIG. 27.

FIG. 21 provides tables listing certain wear characteristics of NITRONIC® 60 and Stellite™ 6. FIG. 22 provides a table listing the composition of NITRONIC® 60. FIG. 23 provides a table comparing the wear compatibility of certain alloys listed therein including INCONEL® 718.

Figure 25:
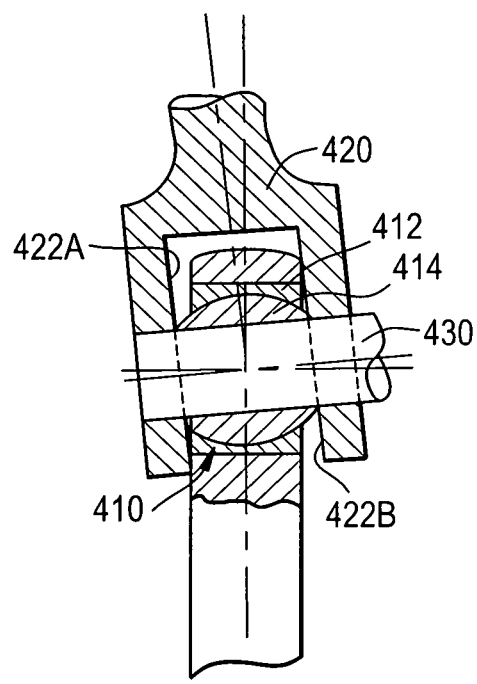
FIG. 25 is a sectional view of a rod end having a bearing positioned therein where such bearing includes a standard inner member or ball with no hubs.

As shown in FIG. 25, a bearing 410 having a standard ball 414, with no integrally formed hubs, and an outer ring 412 is mounted within a clevis 420 via a link shaft 430. The ball 414 contacts inside clevis walls 422A and 422B thereby limiting misalignment. In contrast, use of hub balls or spacers accommodate further spacing apart of the clevis walls 422A and 422B thereby permitting greater misalignment. However, the link shaft 430 can bend more readily leading to the cracking or other failure of the ball 414. The use of hub balls for the inner member, for example the inner member 14 of the bearing 10, accommodates further spacing apart of the clevis walls 422A and 422B. Consequently, hub balls increase the length-to-diameter ratio that a linking shaft 30 (e.g., a pin or bolt) must span.

Figure 6:
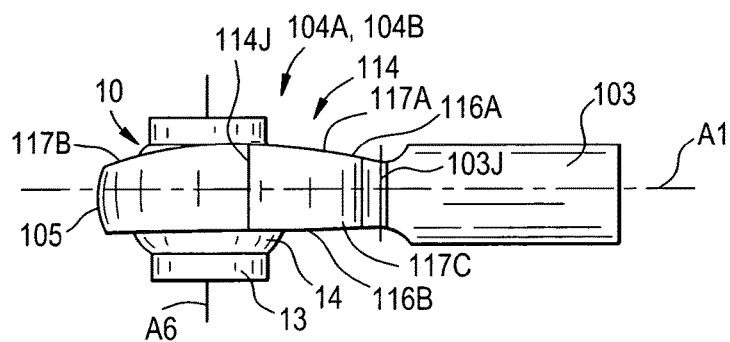
FIG. 6 is a side view of the head portion of the rod end of FIG. 4.
Figure 10:
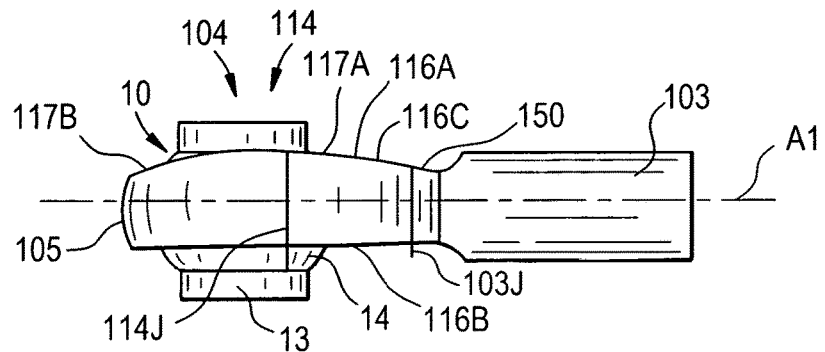
FIG. 10 is a side view of the head portion of the rod end of FIG. 8.
Figure 26:
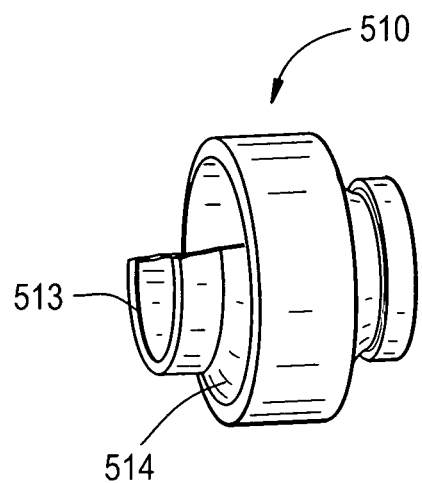
FIG. 26 is a perspective view of a typical ball fracture of a hub ball manufactured from brittle materials.

Thus, integrally forming hubs 13 with the ball 14, for example as shown in FIGS. 6, 10 and 14, greatly simplifies assembly; however, the integrally formed hubs 13 introduce a risk of ball cracking. A typical ball fracture of a hub ball 514 and an integrally formed hub 513 of a bearing 510 manufactured from brittle materials is shown in FIG. 26. In contrast, fabricating a ball with integrally formed hubs, for example the inner member 14 and integrally formed hubs 13 of the bearing 10, from an alloy with greater elongation (or ductility) increases the toughness and reduces or eliminates the risk of ball cracking. The present invention provides a bearing that exhibits the wear properties of a bearing fabricated from Stellite materials or Cobalt materials, yet has increased elongation to prevent ball cracking. The bearing of the present invention also survives the stresses of forming or swaging for use in a spherical plain bearing construction.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A rod end comprising:
   a shaft having a first end and a second end;
   a head extending from the shaft at the first end, the head having an opening extending between a first axial face and a second axial face thereof;
   a spherical bearing rotatably disposed in the opening, the spherical bearing being manufactured from an austenitic stainless steel alloy comprising 16 to 17 weight percent chromium and 0.1 to 0.18 weight percent nitrogen; and
   wherein the shaft and head comprise an austenitic nickel-chromium-based stainless steel alloy comprising 50-55 wt % nickel and 17-21 wt % chromium;
   a wear mitigation feature bonded to at least one of the first axial face and the second axial face, the wear mitigation feature comprising a self-lubricating liner;
   the wear mitigation feature having an area of a magnitude configured to cover at least a portion of at least one of the first axial face and the second axial face; and
   wherein the wear mitigation feature extends from the opening to a distal edge of the head.

2. The rod end of claim 1, wherein at least one of the first axial face and the second axial face is profiled having at least one radius of curvature.

3. The rod end of claim 1, wherein the self-lubricating liner comprises polytetrafluoroethylene.

4. The rod end of claim 1, wherein the self-lubricating liner is a high temperature liner capable of withstanding an operating temperature of 600° F. or greater.

5. The rod end of claim 1, wherein the first axial face is profiled having at least one radius of curvature and the second axial face is flat.

6. The rod end of claim 1, wherein:
   the first axial face comprises at least one non-zero radius of curvature; and
   the second axial face being flat.

7. The rod end of claim 6, wherein the first axial face extends continuously from a junction end of the shaft to the distal edge.

8. The rod end of claim 6, further comprising a channel formed in the first axial face between lateral sides of the head and aligned with the opening.

9. The rod end of claim 1, wherein:
   the first axial face and the second axial face each comprise at least one non-zero radius of curvature.

10. The rod end of claim 9, wherein the first axial face and the second axial face each extend continuously from a junction end of the shaft to the distal edge.

11. The rod end of claim 9, further comprising a channel formed in at least one of the first axial face and the second axial face, between lateral sides of the head and aligned with the opening.

12. The rod end of claim 1, wherein the head comprises a metallic material.

13. A linkage apparatus comprising the rod end of claim 1, further comprising:
    a second head extending from the second end of the shaft.

14. The rod end of claim 1, wherein the spherical bearing comprises an outer member formed around an inner member and the wear mitigation feature being spaced apart from the inner member.

15. A rod end comprising:
    a shaft;
    a head extending from the shaft, the head having an opening extending between a first axial face and a second axial face thereof,
    a spherical bearing rotatably disposed in the opening, the spherical bearing being manufactured from an austenitic stainless steel alloy comprising 16 to 17 weight percent chromium and 0.1 to 0.18 weight percent nitrogen; and
    wherein the shaft and head comprise an austenitic nickel-chromium-based stainless steel alloy comprising 50-55 wt % nickel and 17-21 wt % chromium;
    a wear mitigation feature bonded to at least one of the first axial face and the second axial face, the wear mitigation feature comprising a self-lubricating liner;
    the wear mitigation feature having an area of a magnitude configured to cover at least a portion of at least one of the first axial face and the second axial face; and
    wherein the wear mitigation feature terminates at the opening.

16. The rod end of claim 15, wherein at least one of the first axial face and the second axial face is profiled having at least one radius of curvature.

17. The rod end of claim 15, wherein the self-lubricating liner comprises polytetrafluoroethylene.

18. The rod end of claim 15, wherein the self-lubricating liner is a high temperature liner capable of withstanding an operating temperature of 600° F. or greater.

19. The rod end of claim 15, wherein the first axial face is profiled having at least one radius of curvature and the second axial face is flat.

20. The rod end of claim 15, wherein:
   the first axial face comprises at least one non-zero radius of curvature; and
   the second axial face being flat.

21. The rod end of claim 20, wherein the first axial face extends continuously from a junction end of the shaft to the distal edge.

22. The rod end of claim 20, further comprising a channel formed in the first axial face between lateral sides of the head and aligned with the opening.

23. The rod end of claim 15, wherein:
   the first axial face and the second axial face each comprise at least one non-zero radius of curvature.

24. The rod end of claim 23, wherein the first axial face and the second axial face each extend continuously from a junction end of the shaft to the distal edge.

25. The rod end of claim 23, further comprising a channel formed in at least one of the first axial face and the second axial face, between lateral sides of the head and aligned with the opening.

26. The rod end of claim 15, wherein the head comprises a metallic material.

27. A linkage apparatus comprising the rod end of claim 15, further comprising:
   a second head extending from the second end of the shaft.

28. The rod end of claim 15, wherein the spherical bearing comprises an outer member formed around an inner member and the wear mitigation feature being spaced apart from the inner member.

\* \* \* \* \*